United States Patent

[11] 3,592,058

| [72] | Inventors | James M. Benson;<br>Edmond Easter, both of Hampton, Va. |
|---|---|---|
| [21] | Appl. No. | 760,014 |
| [22] | Filed | Sept. 17, 1968 |
| [45] | Patented | July 13, 1971 |
| [73] | Assignee | Teledyne, Inc.<br>Los Angeles, Calif. |

[54] OMNIDIRECTIONAL FLUID VELOCITY MEASURING DEVICE
3 Claims, 11 Drawing Figs.

| [52] | U.S. Cl. | 73/204 |
|---|---|---|
| [51] | Int. Cl. | G01p 5/10 |
| [50] | Field of Search | 73/204, 189, 399 |

[56] References Cited
UNITED STATES PATENTS

| 2,745,283 | 5/1956 | Hastings | 73/204 |
|---|---|---|---|
| 2,859,617 | 11/1958 | Adams | 73/204 |
| 2,924,972 | 2/1960 | Biermann | 73/204 |
| 3,304,778 | 2/1967 | Stuart | 73/189 |

FOREIGN PATENTS

| 743,681 | 1/1956 | Great Britain | 73/399 |
|---|---|---|---|

OTHER REFERENCES

Hastings, A NEW TYPE INSTRUMENT FOR MEASURING AIR VELOCITY, Dec. 1948, pp. 1— 5, Copy in 73—204.

*Primary Examiner*—Charles A. Ruehl
*Attorney*—Cushman, Darby & Cushman

ABSTRACT: Apparatus for sensing fluid flow in all directions of azimuth in a predetermined plane irrespective of changes in ambient temperature and of changes in composition or static pressure of the fluid wherein the apparatus provides for at least one unshielded thermocouple and one shielded thermocouple in circuit relationship wherein the shielded thermocouple is sensitive to the static characteristics of the fluid and wherein the unshielded thermocouple is additionally sensitive to the dynamic characteristics of the fluid so that the accurate velocity of the fluid flow can be determined independently from variations in the static characteristics of the fluid, e.g. composition or static pressure. Apparatus is also disclosed which utilizes three exposed thermocouple junctions located in a line for accurately sensing fluid flow in all directions of azimuth in a predetermined plane independently of changes in ambient temperature.

INVENTORS
JAMES M. BENSON
EDMOND EASTER

BY Cushman, Darby & Cushman
ATTORNEYS

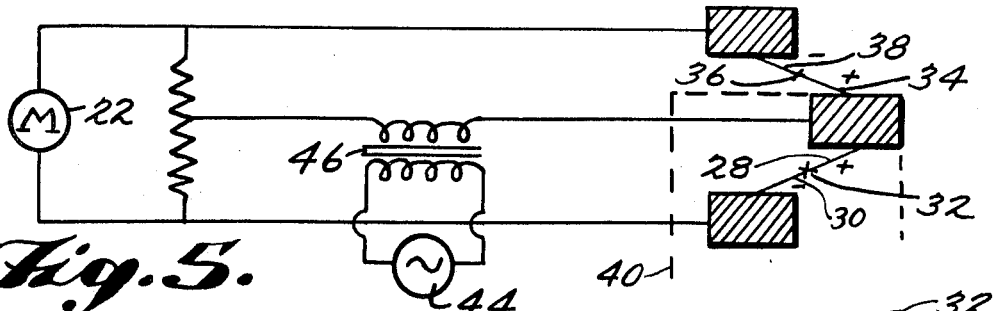
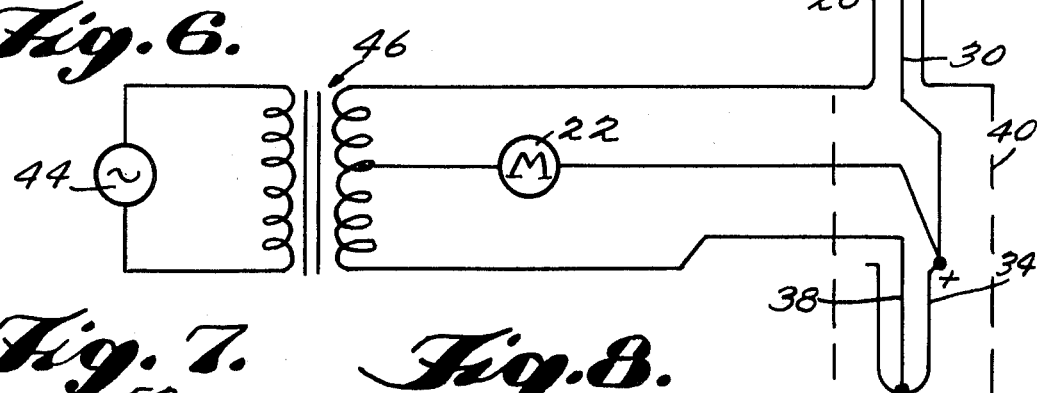
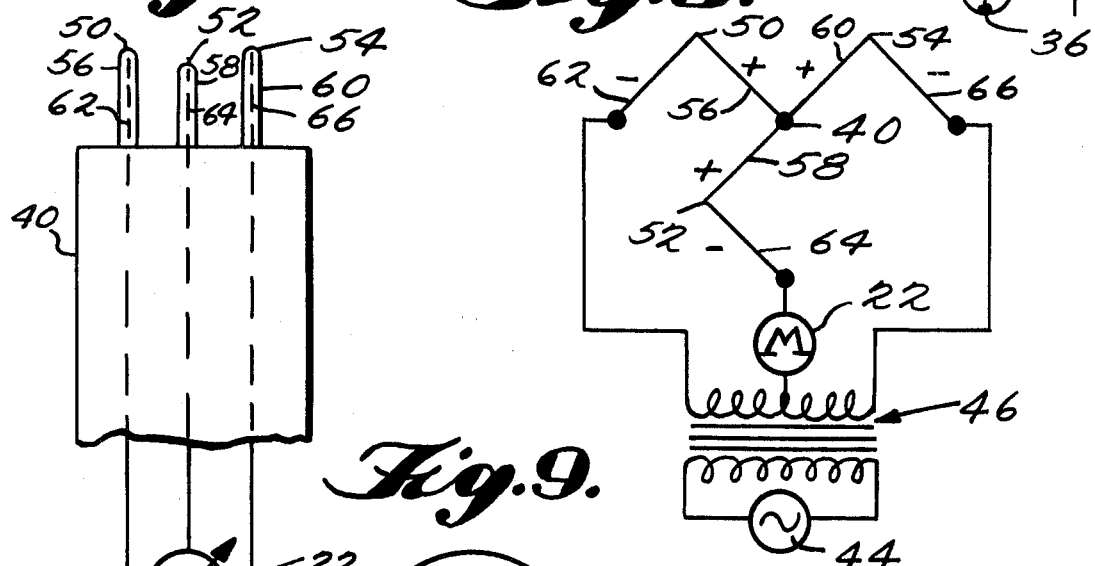
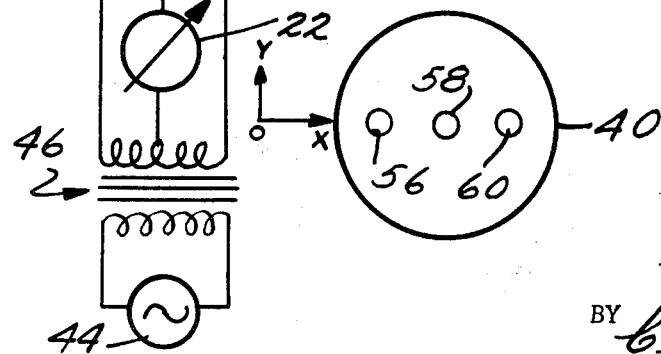

PATENTED JUL 13 1971

INVENTORS
JAMES M. BENSON
EDMOND EASTER

BY Cushman, Darby & Cushman
ATTORNEYS

OMNIDIRECTIONAL FLUID VELOCITY MEASURING DEVICE

BACKGROUND OF THE INVENTION

The present invention relates generally to improvements in velocity measuring devices and the like and more particularly to new and improved omnidirectional thermopile fluid velocity measuring devices wherein the velocity of a fluid can be accurately determined for any direction of azimuth in a predetermined plane and wherein the velocity so determined is independent from any changes in ambient temperature and of any changes in the composition or static pressure of the fluid.

Numerous forms of heat-transfer devices have been used to measure the velocity of fluids as a function of the cooling effect of the fluid stream upon a heated probe located within the stream. Probes that have employed heated thermocouples or wires have heretofore required some form of auxiliary support that interferes with the free fluid stream when it is directed onto the probe from certain directions. A typical prior art arrangement is shown in FIG. 1. It can be seen that when the stream is directed as shown, the heated wire or thermocouple is fully exposed to the free stream; but if the direction of fluid flow is reversed, the hot wire is in the wake of the support 20 and the cooling effect of the stream on the wire is reduced as a result so as to provide an inaccurate indication of fluid speed. In addition, multiple arrays have been used with a single post supporting several wires disposed in various manners about the support, but these arrays also have one or more directions in which the cooling effect of the fluid stream flowing over a heated wire will be materially reduced by the wake from the support. Still other devices have been used that are adapted to swivel around to point into the wind, but these devices require the use of bearings and commutators which can often be troublesome.

In each of these prior art devices wherein exposed wires and thermocouples are utilized in conjunction with electrical insulating surfaces that are also exposed to the stream being measured, the insulating surfaces may become contaminated and cause spurious electrical signals that will interfere with the normal functioning of the devices

SUMMARY OF THE INVENTION

Therefore, the general purpose of this invention is to provide apparatus for enabling the accurate determination of fluid velocity for all directions of azimuth in a predetermined plane which embraces all the advantages of similarly employed prior art devices and possesses none of the aforedescribed disadvantages. To attain this the present invention contemplates a unique arrangement of thermocouple probes wherein at least one probe is exposed to the fluid stream and wherein at least one other probe is shielded from the dynamic flow of the stream whereby changes in the composition of the fluid and/or in the ambient temperature is compensated for so that the accurate velocity of the fluid stream can be determined independently from these extraneous variables. In addition, the present invention contemplates an arrangement of three thermocouples that are exposed to the fluid flow and which are located in a line to accurately sense fluid flow in all directions of azimuth in a predetermined plane independently of changes in ambient temperature.

An object of the present invention is the provision of an omnidirectional fluid velocity measuring device wherein the accuracy is not affected by changes in the composition or static pressure of the fluid.

Another object is to provide such a device wherein the accurate velocity of the fluid stream can be determined irrespective of changes in ambient temperature.

A further object of the invention is the provision of a fluid velocity measuring device which can accurately determine the velocity of fluid flow for any direction of azimuth.

Other objects and features of the invention will become apparent to those of ordinary skill in the art as the disclosure is made in the following description of preferred embodiments of the invention as illustrated in the accompanying drawings.

BRIEF DESCRIPTION OF THE DRAWINGS

FIG. 5 illustrates a more detailed schematic diagram of the dual probe device shown in FIG. 4;

FIG. 6 is a view, partly in schematic, of another dual probe device similar to those shown in FIGS. 2 and 4;

FIG. 7 is a side elevation, partly in schematic, of a three probe fluid velocity measuring device;

FIG. 8 is a more detailed schematic view of the device shown in FIG. 7;

FIG. 9 is a plan view of the device shown in FIG. 7;

DESCRIPTION OF THE PREFERRED EMBODIMENTS

Figure 1:
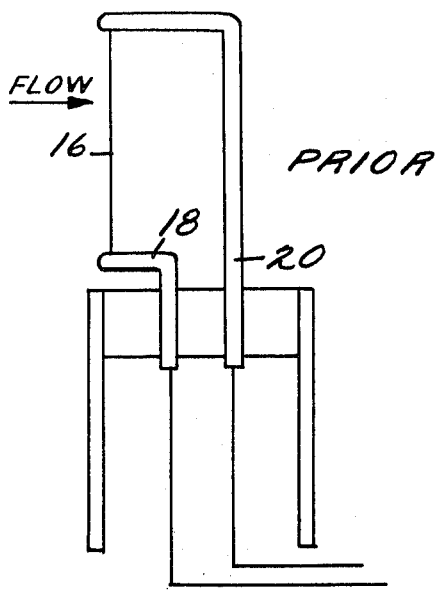
FIG. 1 shows a side elevation of a prior art fluid velocity measuring device.

With reference now to the drawings, there is shown in FIG. 1 a typical prior art arrangement of a heated wire or thermocouple 16 supported by conductive supports 18 and 20 wherein the stream is directed from left to right as shown. It can be seen that with this type of structure the wire 16 is located in the wake of the support 20 when the direction of the stream is reversed from that shown in FIG. 1. This results in a reduction of the cooling effect of the stream on the wire 16 and a corresponding inaccurate reading of fluid velocity by the measuring circuits (not shown).

Velocity measuring devices such a shown in FIG. 1 and similar devices which utilize a single-thermocouple probe are affected by convective cooling, and in order to provide accurate measurements of fluid flow velocity must do so independently of variations in the composition or static pressure of the fluid which may introduce variations in the thermal conductivity of the fluid. In order for the thermocouple device to indicate the velocity of the fluid independently of other variables, any change in thermal conductivity of the fluid as caused by a change in composition or a change in static pressure must be compensated for by the velocity measuring device. The prior art thermocouple velocity measuring devices have not provided this compensation so that when the fluid is changed, for example from air to a quiescent mixture of air and hydrogen, the additional cooling caused by the hydrogen will cause a false indication of some finite velocity of the fluid in these prior art devices. That this effect would occur in such prior art devices can be seen from the device shown in FIG. 1 wherein the wire 16 is a heated wire or thermocouple. In the normal operation of this device the flow of the stream over the wire 16 causes the cooling of the heated wire which results in a reduction in the current flow emanating therefrom. This reduction in the current is then represented by the measuring circuits (not shown) as an increase in the velocity of the fluid stream. If, however, the composition of the fluid passing over the wire 16 is changed, for example from air to a quiescent mixture of air and hydrogen, the additional cooling of the wire 16 caused by the hydrogen will result in a false indication of increased fluid velocity by the measuring circuits.

Figure 2:
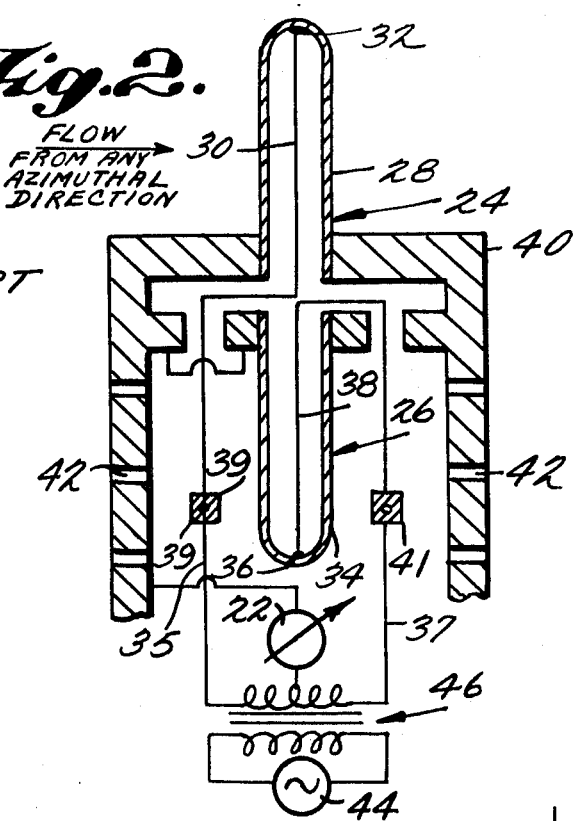
FIG. 2 illustrates, partly in schematic, a side elevation of one embodiment of the invention.

FIG. 2 illustrates an embodiment of the present invention which not only is capable of measuring fluid velocity in any direction of azimuth in a predetermined plane, but which also compensates for variations in the composition or static pressure of the fluid so that the reading provided at meter 22 is an accurate indication of fluid velocity alone. The device of FIG. 2 is composed of two thermocouple elements or probes generally represented as 24 an 26 wherein each is formed of concentric conductors. For example, an outer tubular conductor 28 of a first material, e.g. constantan, is joined at the upper tip with an inner conductor 30 of a second material, e.g. alumel, so as to form a thermoelectric junction at point 32. The other probe 26 is similarly constructed but has an outer conductor 34 of the second material, e.g. alumel, joined at the tip 36 with an inner conductor of the first material, e.g. constantan. Each element 24 and 26 is rigidly and conductively engaged with an electrically conductive support and heat sink 40 which also acts to shield the lower junction 36 from the fluid flow. The conductors 30 and 38 are also connected to copper conductors 35 and 37 at the relatively massive heat sinks 39 and 41 which are electrically isolated from heat sink 40 and from each other. In addition, the shield 40 is provided with a series of bleed holes 42 which enable the entry of the fluid into the cavity formed by the shield so that the fluid envelops the element 26. In this way the static characteristics of the fluid, which vary according to the composition or static pressure of the fluid, are sensed by element 26. Element 24 is not shielded from the fluid flow so it senses the movement of the fluid as well as the static characteristics thereof.

Figure 3:
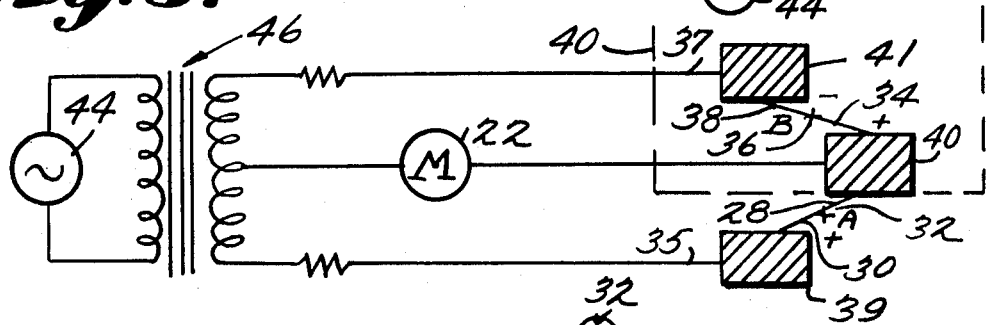
FIG. 3 shows a schematic view of the embodiment shown in FIG. 2.

An electrical circuit which enables the equal heating of junctions 32 and 36 is also shown in FIG. 2 and in FIG. 3. An AC voltage source 44 is coupled across the primary coil of transformer 46, while the secondary thereof is coupled across the thermocouple elements 24 and 26. Thus, it can be seen from a study of FIGS. 2 and 3 that under static conditions of zero fluid velocity where the thermocouple elements 24 an 26 are heated equally, the electrical outputs therefrom are connected in opposition with respect to the meter 22 so that a zero reading is indicated thereby. The bleed holes 42 in the supporting shield 40 allow the fluid to diffuse into the space around the shielded junction 36, thereby assuring that both junctions 32 and 36 remain at equal temperatures as long as the fluid velocity is zero even when changes in fluid composition or static pressure occur. Thus, upon the increase in velocity of the fluid flow across the thermocouple junction 32, that junction is cooled to a greater extent than is the junction 36 so that the electrical outputs from junctions 32 and 36 are no longer balanced and the meter 22 will indicate the velocity of the fluid.

As a result of the arrangement of the device as shown in FIGS. 2 and 3, it can be seen that a change in composition of the fluid from air to a quiescent mixture of air and hydrogen, for example, will not affect the accuracy of the device as it indicates fluid velocity since both junctions 32 and 36 are exposed to the fluid at all times so that any changes in thermal conductivity of the fluid which would result in changes in temperature of the junctions 32 and 36 are balanced out by the associated circuitry, and the meter 22 represents only fluid velocity independent of any changes in the composition or static pressure thereof.

Figure 4:
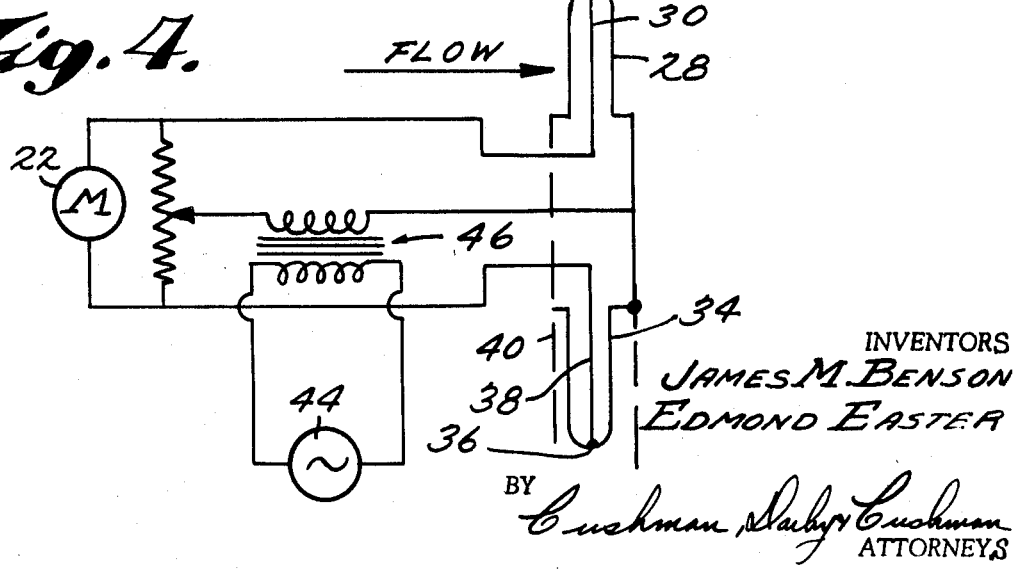
FIG. 4 is a view, partly in schematic, of a dual probe device similar to that shown in FIG. 2.

Additional embodiments of a two probe omnidirectional fluid velocity measuring device are shown in FIGS. 4—6 wherein FIG. 5 is a more detailed schematic of the embodiment represented in FIG. 4. These embodiments work on the same principle as that disclosed in FIG. 2, and it can be seen that junction 32 is exposed to the fluid flow while junction 36 is shielded therefrom by means of shield 40 in each case. Again, under static conditions wherein the junctions are at the same temperature the electrical outputs therefrom are in opposition with respect to the meter 22 so that zero reading is indicated on the meter. When the velocity of the fluid increases the temperature of junction 32 is reduced as a result thereof so that the outputs from junctions 32 and 36 are no longer balanced and meter 22 represents directly the velocity of the fluid.

The embodiment represented in FIG. 6 operates according to the same principles as govern the operation of the circuits represented in FIGS. 2 and 4. Under static conditions the junctions 32 and 36 are heated equally so that the electrical outputs therefrom are opposed with respect to the meter 22 which registers zero under these conditions. However, when the velocity of the fluid increases the temperature of junction 32 is reduced so that the electrical outputs from junctions 32 and 36 are no longer the same and the meter 22 indicates the velocity of the fluid as it passes over junction 32.

The circuits disclosed in the U.S. Pat. to Hastings, No. 2,745,283, of May 15, 1956 show the use of a compensating thermocouple which may be used with a fluid velocity measuring device to compensate for transients generated during changes in ambient temperatures. This feature is highly desirable where the device is utilized in an environment which is characterized by considerable temperature changes. The concept of a compensating thermocouple as disclosed in the U.S. Pat. No. 2,745,283 is utilized in the circuit represented in FIGS. 7 and 8 with an additional feature of this invention providing an omnidirectional fluid velocity measuring device. The circuitry of the device represented in FIGS. 7 and 8 is identical with that shown in FIG. 4 of the Hastings patent. However, the device disclosed in FIGS. 7 and 8 by having the thermocouple junctions 50, 52 and 54 located in a line with respect to one another provides the important additional feature of accurately measuring the fluid flow as it passes over the junctions for an direction of azimuth. Each of the probes having junctions 50, 52 and 54, respectively, is composed of an outer tubular conductor 56, 58 and 60, respectively, which is made of a first material, e.g. constantan. Each of the probes also includes an inner conductor 62, 64 and 66, respectively, which is made of a second material, e.g. copper. It is evident that if the stream of fluid is directed onto the probes from an direction normal to the axes of the probes except along or near the line O-X in FIG. 9, each of the three thermal junctions 50—54 will be fully exposed to the flow, and the velocity of the fluid can be determined as described in U.S. Pat. No. 2,745,283 with the junction 52 compensating for transient changes in ambient temperature. If the fluid flow is directed along O-X either left-to-right or right-to-left in FIG. 9, the unheated junction 52 will be in wake of a heated junction, e.g. junction 50 or 54, and the other heated junction will be in the wake of both a heated junction and the unheated junction. However, because of the location of the probes in a line and adjacent to one another, the cooling of junction 50 or of junction 54 affects the meter 22 in the same way as does the heating of compensating junction 52. This can be seen more clearly in FIG. 8 wherein the heating of junction 52 results in an increase in current through meter 22 in a downward direction so as to oppose a flow of current through the meter 22 in an upward direction as generated by junction 50 or 54. Thus, the end result is a decrease of the total resultant current in the upward direction through meter 22. It can be also seen that this same result is accomplished by cooling junction 54 which results in the lessening of current flow through meter 22 in the upward direction.

Thus, whenever the fluid flow is in such a direction that the wake of one of the heated junctions 50 or 54 passes over the remaining two junctions, the cooling effect on the downstream heated junction is reduced but at the same time the central junction 52 is heated so as to compensate for the diminished cooling of the other downstream junction. Obviously, the device shown in FIGS. 7 and 8, as well as that shown in FIG. 3, requires a suitable choice of dimensions and materials to function properly and to have sufficient strength to withstand stresses caused by exposure to the fluid flow. For example, sensitivity to flow is affected by the length of the tubular projection, the thickness of the wall of the tubular conductor, and the thermal conductivity of the materials. Numerous other factors may also affect the sensitivity of the device. Thus, the compensating action of the three tubular thermocouples shown in FIG. 7 requires a suitable choice of spacing, tube diameters and heights to be effective. One example that has proven satisfactory uses the arrangement shown IN FIG. 7 in which the tubes of constantan 56, 58 and 60 have an outside diameter of 0.026 inch and project eleven-sixteenths inch above the supporting heat sink 40. The distance from junction 50 to junction 52 is the same as that from junction 52 to junction 54 and is equal to three-sixteenths inch. A device built according to these specifications showed less than three percent variation in electrical response with wind direction as the device was rotated about the vertical axis with a steady wind of 300 feet per minute directed normal to the axis of the probes. It has also been found by experiment that this small variation may be further reduced by altering the lengths of the tubular thermocouples so that junction 52 in FIG. 7 is at a different height above the heat sink 40 than the junctions 50 and 54.

Figure 10:
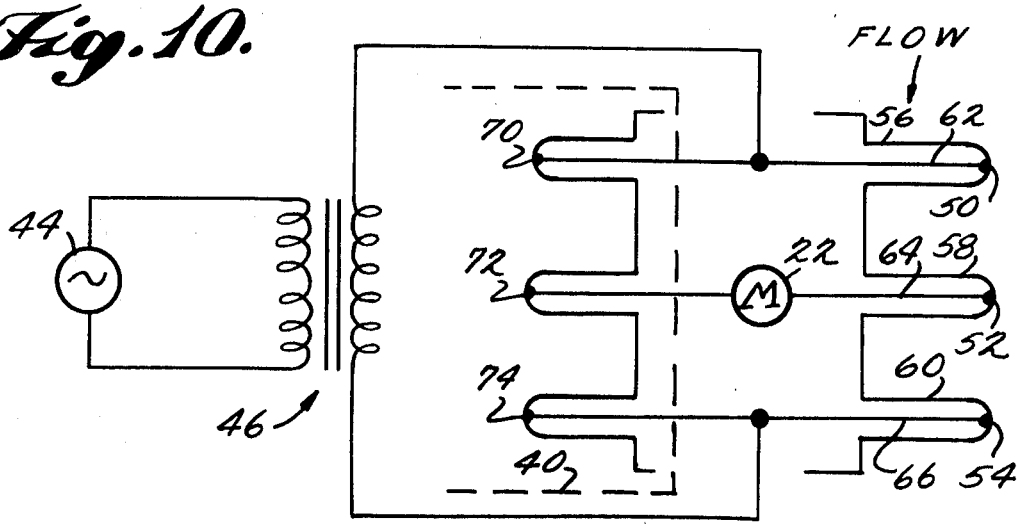
FIG. 10 shows a schematic view of a six probe fluid velocity measuring device.
Figure 11:
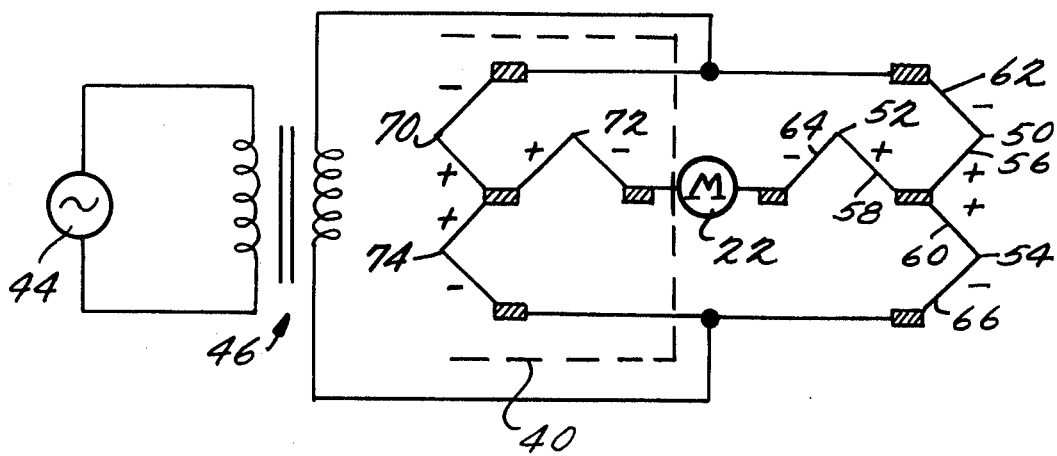
FIG. 11 illustrates a more detailed schematic view of the device shown in FIG. 9.

Still another embodiment of this invention which utilizes the concept of three probes in a line in conjunction with the concept of a shielded probe or probes is represented in FIGS. 10 and 11, wherein FIG. 11 is a more detailed schematic view of the device shown in FIG. 10. The device includes two hot thermocouple junctions 50 and 54 and one cold junction 52 as in the device of FIGS. 7 and 8. In addition, junctions 70, 72 and 74 are formed by the connection between two dissimilar metals wherein the inner and outer conductors are formed of the same metals, respectively, as are the inner and outer conductors which form junctions 50—54.

Under static conditions wherein the velocity of the fluid is zero the thermoelectric EMF's generated by the junctions 50—54 oppose the EMF's generated by the shielded junctions 70—74 so that meter 22 indicates a condition of zero velocity of fluid flow. However, upon an increase of velocity of the fluid the heated junctions 50 and 54 will be cooled to a greater extend than the heated junctions 70 and 74 which are shielded from all but the static conditions of the fluid, and as a result, the EMF's generated by junctions 50 and 54 will predominate so as to result in a reading on meter 22 representative of the velocity of the fluid.

Because the device shown in FIGS. 10 and 11 utilizes the compensating junction 52, the device has the capability of compensating for transient ambient temperature changes as described in U.S. Pat. No. 2,745,283. In addition, because of the use of shielded junctions 70—74 the device operates independently from variations in the composition or static pressure of the fluid, and finally, because the probes are aligned with respect to one another the device has the ability to measure fluid flow for any direction of azimuth in a predetermined plane normal to the axes of the probes.

This invention provides for a unique and highly accurate omnidirectional fluid velocity measuring apparatus which operates to accurately provide a measurement of velocity of fluid flow independent of direction and independent of transient ambient temperature changes or variations in the composition or static pressure of the fluid.

It should be understood, of course, that the foregoing disclosure relates to only preferred embodiments of the invention and that numerous modifications or alterations may be made therein without departing from the spirit and the scope of the invention as set forth in the appended claims.

We claim:

1. A heat transfer measuring device capable of measuring fluid velocity oriented at any direction of azimuth in a predetermined plane, said device comprising:

at least three thermocouples, means for mounting said thermocouples in a line with respect to one another and spaced apart by predetermined equal distances and for exposing said thermocouples to a surrounding fluid medium and to the flow thereof, circuit means in operative relationship with each said thermocouple for heating the outer two of said thermocouples and for responding to any differences between voltages produced by said thermocouples, and wherein the center one of said three thermocouples is of a different size than the remaining outer two of said three thermocouples.

2. A heat transfer measuring device capable of measuring fluid velocity for any direction of azimuth in a predetermined plane, said device comprising:

at least three thermocouples, means mounting said thermocouples to be exposed to a surrounding fluid medium and to movement thereof, said thermocouples being located along a line with respect to one another and spaced apart by equal predetermined distances, circuit means in operative relationship with each said thermocouples for heating the outer two of said thermocouples and for responding to any differences between voltages produced by said thermocouples, and wherein a center one of said thermocouples is of a different size than the remaining outer two thermocouples.

3. A device as in claim 2 wherein said thermocouples are probe-type thermocouples.